(12) United States Patent
Ma et al.

(10) Patent No.: US 12,085,039 B2
(45) Date of Patent: Sep. 10, 2024

(54) COMPOSITE COATING, PISTON, ENGINE AND VEHICLE

(71) Applicant: WEICHAI POWER CO., LTD., Shandong (CN)

(72) Inventors: Fei Ma, Shandong (CN); Ninglu Wang, Shandong (CN); Lingyan Guo, Shandong (CN); Shanhong Wan, Shandong (CN); Guolong Huang, Shandong (CN); Qiangzhen Zang, Shandong (CN)

(73) Assignee: WEICHAI POWER CO., LTD., Shandong (CN)

( * ) Notice: Subject to any disclaimer, the term of this patent is extended or adjusted under 35 U.S.C. 154(b) by 0 days.

(21) Appl. No.: 18/265,763

(22) PCT Filed: Mar. 30, 2022

(86) PCT No.: PCT/CN2022/083897
§ 371 (c)(1),
(2) Date: Jun. 7, 2023

(87) PCT Pub. No.: WO2022/206793
PCT Pub. Date: Oct. 6, 2022

(65) Prior Publication Data
US 2024/0026837 A1    Jan. 25, 2024

(30) Foreign Application Priority Data

Mar. 30, 2021 (CN) .......................... 202110337886.9

(51) Int. Cl.
*F02F 3/12* (2006.01)
*C23C 4/00* (2016.01)
(Continued)

(52) U.S. Cl.
CPC ................... *F02F 3/12* (2013.01); *C23C 4/02* (2013.01); *C23C 4/073* (2016.01); *C23C 4/11* (2016.01); *C23C 4/129* (2016.01); *C23C 4/134* (2016.01)

(58) Field of Classification Search
CPC .................................. F02F 3/12; C23C 4/073
See application file for complete search history.

(56) References Cited

U.S. PATENT DOCUMENTS 5,169,674 A * 12/1992 Miller ....................... C23C 4/02
427/404
5,705,231 A * 1/1998 Nissley ..................... C23C 4/02
427/454

(Continued)

FOREIGN PATENT DOCUMENTS

CN          105603351 A       5/2016
CN          108441807 A       8/2018
(Continued)

OTHER PUBLICATIONS

International Search Report for International Application No. PCT/CN2022/083897; Date of Mailing, Jun. 23, 2022.
(Continued)

*Primary Examiner* — Long T Tran
(74) *Attorney, Agent, or Firm* — CANTOR COLBURN LLP

(57) ABSTRACT

Provided are a composite coating, a piston, an engine, and a vehicle. The composite coating comprises a metal bonding layer, a transition layer, a ceramic layer, and a sealing layer which are sequentially laminated, wherein the metal bonding layer is configured to be bonded with a piston basic body, the metal bonding layer is a rare earth metal modified bonding layer, and the transition layer is a rare earth metal modified zirconia layer.

19 Claims, 2 Drawing Sheets

(51) Int. Cl.
*C23C 4/02* (2006.01)
*C23C 4/073* (2016.01)
*C23C 4/11* (2016.01)
*C23C 4/129* (2016.01)
*C23C 4/134* (2016.01)

(56) References Cited

U.S. PATENT DOCUMENTS

| | | |
|---|---|---|
| 8,039,117 B2 | 10/2011 | Kulkarni et al. |
| 2008/0131608 A1 | 6/2008 | Torigoe et al. |
| 2008/0131711 A1 | 6/2008 | Kulkarni et al. |
| 2017/0145914 A1* | 5/2017 | Lineton .................. C23C 28/36 |
| 2017/0145952 A1* | 5/2017 | Lineton .................. C23C 4/073 |
| 2017/0268457 A1* | 9/2017 | Azevedo .............. B01J 37/0244 |
| 2018/0128166 A1* | 5/2018 | Lineton ..................... F02F 3/26 |
| 2018/0216524 A1* | 8/2018 | Lineton ..................... F01L 3/04 |

FOREIGN PATENT DOCUMENTS

| | | |
|---|---|---|
| CN | 108495946 A | 9/2018 |
| CN | 110055486 A | 7/2019 |
| CN | 113088859 A | 7/2021 |
| JP | 2013185200 A | 9/2013 |
| WO | 2023143062 A1 | 8/2023 |

OTHER PUBLICATIONS

Extended European Search Report for EP Application No. 22778975.7; issued Jul. 1, 2024; 50 pages.

* cited by examiner

COMPOSITE COATING, PISTON, ENGINE AND VEHICLE

CROSS REFERENCE TO RELATED APPLICATIONS

This is the U.S. national stage of application No. PCT/CN2022/083897, filed on Mar. 30, 2022. Priority under 35 U.S.C. § 119(a) and 35 U.S.C. § 365(b) is claimed from Chinese Application No. 202110337886.9, filed Mar. 30, 2021, the disclosure of which is also incorporated herein by reference.

FIELD

The present disclosure relates to the field of packaging, and in particular to a composite coating, piston, engine and vehicle.

BACKGROUND

According to statistics, about 25% of the energy generated by combustion in piston combustion chambers in an engine is lost through a cylinder liner and a cooling oil passage. The temperature at the top of the piston continues to be high (>320° C.). The steel piston itself has good thermal conductivity, which can easily cause a large temperature difference between the cooling oil passage and the combustion chamber and the coking of the cooling oil, finally leading to the risk of the top of the steel piston cracking, and serious coking of the cooling oil, which easily blocks the inner cooling oil passage. In addition, the top surface of the steel piston (i.e., the groove on the top surface of the steel piston) and the surface of the combustion chamber are more prone to high-temperature oxidation corrosion and gas corrosion, further causing the top of the steel piston to peel off and thus fail. The top surface of the piston and the surface of the combustion chamber are called ablation surfaces.

By providing a heat insulation coating on the ablation surface of the piston, the heat loss of the cooling system can be reduced and the anti-carbon deposition and anti-oxidation performance of the top of the steel piston can be improved, which is a technical solution to improve the fuel efficiency and service life of modern heavy-duty diesel engines. The research on the heat-insulating protective coating for the main body of the internal combustion engine piston can be traced back to 40 years ago, but there is no mature product so far. At present, the heat insulation coating on the top of the piston used in diesel internal combustion engines in China relies on imports. The heat insulation protection technology is mainly mastered by foreign companies working on internal combustion engine parts (such as Mahle and Federal-Mogul), and Chinese companies working on high-power diesel engines are still in the exploration stages of the technology of heat insulation management in piston system. Although typical aviation heat insulation protective coating such as zirconia ceramic material is suitable for jet engine and turbine, it is not suitable for high-power diesel internal combustion engine piston system, mainly due to the long service life of internal combustion engine piston system, long-term mechanical-thermal effects and chemical corrosion, and low cost of coating materials.

Patents such as U.S. Ser. No. 10/578,050B2, WO2017087733, and CA2739008 disclose that a metal bonding layer is first applied on the surface of a piston body, and then a ceramic coating is applied on the surface of the metal bonding layer to improve the service life of the piston. However, these existing ceramic coatings usually have a porous structure. Under high temperature and high pressure, gas can erode the subsurface layer of the ceramic coating, and even spread to the interface junction between the ceramic coating and the metal bonding layer, resulting in weakening of the interfacial bonding strength. Especially in the case that there is a large difference in thermal expansion coefficient between the metal bonding layer and the ceramic coating, and the ceramic material itself is brittle, the ceramic coating is easy to fall off.

SUMMARY

The present disclosure discloses a composite coating, a piston, an engine and a vehicle, which are configured to solve the problem of a short service life of a piston due to a surface coating of the piston being prone to falling off.

In order to achieve the above purpose, the present disclosure provides the following technical solutions:

In a first aspect, the present disclosure provides a composite coating for piston, the composite coating comprises a metal bonding layer, a transition layer, a ceramic layer and a sealing layer which are sequentially laminated; wherein the metal bonding layer is configured to be bonded with a piston basic body, the metal bonding layer is a rare earth metal modified bonding layer, and the transition layer is a rare earth metal modified zirconia layer.

Further, the metal bonding layer is selected from the group consisting of a rare earth metal modified NiCoCrAlY layer, a rare earth metal modified NiCrAlY layer, a rare earth metal modified NiAlY layer and a combination thereof, where the rare earth metal is selected from the group consisting of Ce, Y, Re, Nd, La, Sm and a combination thereof.

Further, in the metal bonding layer, the addition amount of rare earth metal is 0.5%-1% by mass percentage.

Further, the metal bonding layer has a thickness of 50-150 µm.

Further, in the modified zirconia layer, the rare earth metal is selected from the group consisting of Ce, Y, Re, Nd, La, Sm and a combination thereof.

Further, in the transition layer, the addition amount of rare earth metal is 0.5%4% by mass percentage.

Further, the transition layer is formed by a raw material with a powder particle size of 10-100 µm.

Further, the transition layer has a thickness of 100-200 µm.

Further, the ceramic layer is selected from the group consisting of zirconia, yttria, yttria-stabilized zirconia and a combination thereof.

Further, the ceramic layer is an yttria-stabilized zirconia layer with a hollow structure.

Further, the ceramic layer has a thickness of 400-500 µm.

Further, the sealing layer is formed by a raw material selected from the group consisting of polysilazane, water glass, polysiloxane and a combination thereof.

In a second aspect, the present disclosure provides a piston, comprising a piston basic body and the composite coating according to the first aspect of the present disclosure, wherein the composite coating is provided on an ablation surface of the piston basic body.

In a third aspect, the present disclosure further provides an engine, comprising the piston according to the second aspect of the present disclosure.

In a fourth aspect, the present disclosure further provides a vehicle, comprising the engine of the third aspect of the present disclosure.

The beneficial effect produced by using the technical solution of the present disclosure is as follows:

The composite coating provided by the present disclosure comprises a metal bonding layer, a transition layer, a ceramic layer and a sealing layer which are sequentially laminated. Among them, the metal bonding layer is a rare earth metal modified bonding layer, the metal bonding layer is configured to be bonded with a piston basic body, and the sealing layer is provided on the outer layer of the composite coating. In the composite coating with such structure, the metal bonding layer is used to improve the bonding strength between the composite coating and the piston basic body to prevent the oxidizing atmosphere from infiltrating the piston basic body; the transition layer is used to adjust the matching degree between the thermal expansion coefficients of the metal bonding layer and the ceramic layer, reduce internal stress, and retard oxygen infiltrating into the metal bonding layer; and the sealing layer is used to seal, improve the smoothness of the piston, reduce carbon adsorption, and prevent the diffusion of the high-temperature and high-pressure gas atmosphere to the metal bonding layer which affects the bonding strength of the metal bonding layer and the transition layer. Therefore, the composite coating with such structure has the advantages of high bonding strength with the piston basic body, stable structure, and not easy to crack.

Since the piston of the present disclosure comprises the composite coating of the present disclosure, the piston of the present disclosure meets the urgent needs of the heat insulation protection technology of the main body system with high-power diesel engine piston. The ablation surface of the piston has the advantages of high heat insulation protection, anti-carbon deposition and good anti-oxidation performance, thereby improving the service life of the piston.

DETAILED DESCRIPTION

Figure 1:
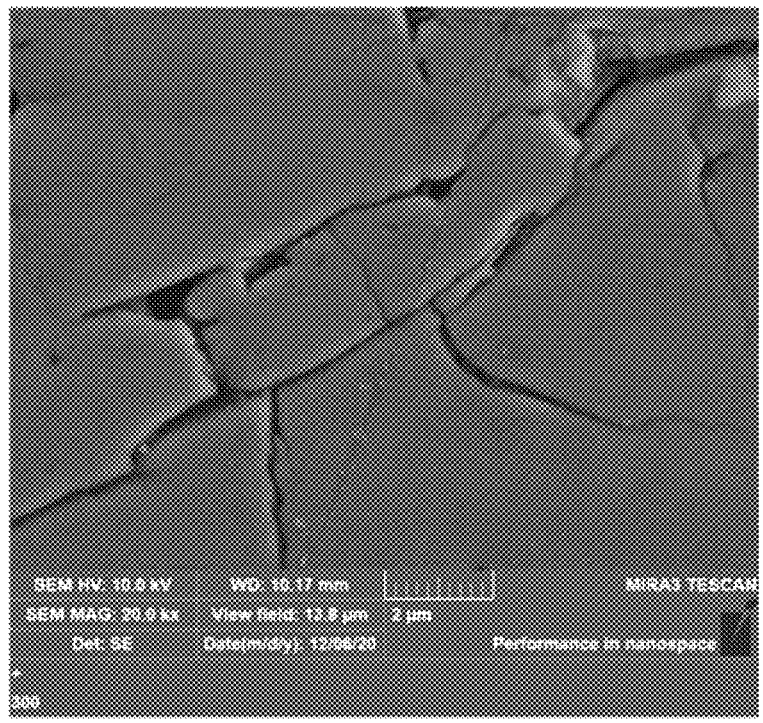
FIG. 1 is an electronic microscopic image of a ceramic layer of an embodiment of the present disclosure.

The technical solutions in the embodiments of the present application will be clearly and completely described below in conjunction with the embodiments of the present application. Apparently, the described embodiments are only some of the embodiments of the present application, but not all of them. Based on the embodiments in the present application, all other embodiments obtained by those of ordinary skill in the art without making creative efforts belong to the protection scope of the present application.

It should be noted that in the present application, unless otherwise specified, all the implementations and preferred implementations mentioned herein may be combined with each other to form a new technical solution. In the present application, unless otherwise specified, all the technical features and preferred features mentioned herein may be combined with each other to form a new technical solution. In the present application, unless otherwise specified, percentage (%) or part refers to the weight percentage or weight part relative to the composition. In the present application, unless otherwise specified, the various components involved or the preferred components thereof may be combined with each other to form a new technical solution. In the present application, unless otherwise stated, the numerical range "a~b" refers to an abbreviated representation of any combination of real numbers between a and b, where a and b are both real numbers. For example, the numerical range "6-22" means that all the real numbers between "6-22" have been listed herein, and "6-22" is just an abbreviated representation of the combination of these numbers. The "range" disclosed in the present application takes the form of a lower limit and an upper limit, and may refer to one or more lower limits, and one or more upper limits, respectively. In the present application, unless otherwise stated, each reaction or operation step may be carried out sequentially or in sequence. Preferably, the reaction processes herein are performed sequentially.

Unless otherwise specified, the professional and scientific terms used herein have the same meanings as those familiar to those skilled in the art. In addition, any method or material similar or equivalent to the content described herein may also be applied in the present application.

In an embodiment of the present disclosure, a composite coating is provided, which comprises a metal bonding layer, a transition layer, a ceramic layer and a sealing layer which are sequentially laminated, in which the metal bonding layer is configured to be bonded with a piston basic body, the metal bonding layer is a rare earth metal modified bonding layer, and the transition layer is a rare earth metal modified zirconia layer.

The composite coating provided in an embodiment of the present disclosure comprises a metal bonding layer, a transition layer, a ceramic layer and a sealing layer which are sequentially laminated. Among them, the metal bonding layer is a rare earth metal modified bonding layer, the metal bonding layer is configured to be bonded with a piston basic body, and the sealing layer is provided on the outer layer of the composite coating. In the composite coating with such structure, the metal bonding layer is used to improve the bonding strength between the composite coating and the piston basic body to prevent the oxidizing atmosphere from infiltrating the piston basic body; the transition layer is used to adjust the matching degree between thermal expansion coefficients of the metal bonding layer and the ceramic layer, reduce internal stress, and retard oxygen infiltrating into the metal bonding layer; and the sealing layer is used to seal, improve the smoothness of the piston, reduce carbon adsorption, and prevent the diffusion of the high-temperature and high-pressure gas atmosphere to the metal bonding layer which affects the bonding strength of the metal bonding layer and the transition layer. Therefore, the composite coating with such structure has the advantages of high bonding strength with the piston basic body, stable structure, and not easy to crack.

In a preferred embodiment of the present disclosure, the metal bonding layer is selected from the group consisting of a rare earth metal modified NiCoCrAlY layer, a rare earth metal modified NiCrAlY layer, a rare earth metal modified NiAlY layer and a combination thereof. The rare earth metal is selected from the group consisting of Ce, Y, Re, Nd, La, Sm and a combination thereof but is not limited thereto. The modification of the metal bonding layer by doping the rare earth metal can increase the bonding strength between the metal bonding layer and the piston basic body so as to make the distribution of the metal bonding layer more uniform, and thus protect the piston basic body more effectively.

In an embodiment of the present disclosure, in the metal bonding layer, the addition amount of rare earth metal is 0.5%4% by mass percentage. The control of the amount of rare earth metal added can more effectively protect the piston basic body and improve the bonding strength between the metal bonding layer and the piston basic body. In the metal bonding layer, the rare earth metal may be added at an amount of, for example, 0.5%, 0.6%, 0.7%, 0.9% or 1.0%.

In a preferred embodiment of the present disclosure, the metal bonding layer has a thickness of 50-150 μm. The metal bonding layer has a thickness of, typically but not limited to, 50 μm, 60 μm, 70 μm, 80 μm, 90 μm, 100 μm, 110 μm, 120 μm, 130 μm, 140 μm or 150 μm.

In a preferred embodiment of the present disclosure, the transition layer is a rare earth metal doped modified zirconia layer, wherein the rare earth metal includes but is not limited to at least one of Ce, Y, Re, Nd, La, and Sm. In the modified zirconia layer, the addition amount of rare earth metal is 0.5%-1% by mass percentage. The addition of a specific content of the rare earth metal can improve the distribution of zirconia, facilitate the crystallization of zirconia and reduce the porosity in the transition layer. For the transition layer, the rare earth metal may be added at an amount of, for example, 0.5%, 0.6%, 0.7%, 0.9% or 1.0%.

In a preferred embodiment of the present disclosure, the rare earth metal-doped modified zirconia layer is formed by a raw material with a powder particle size of 10-100 μm. The rare earth metal-doped modified zirconia layer may be formed by a raw material having a powder particle size of, for example, 10 μm, 20 μm, 30 μm, 40 μm, 50 μm, 60 μm, 70 μm, 90 μm or 100 μm.

In a preferred embodiment of the present disclosure, the transition layer has a thickness of 100-200 μm. The modified zirconia layer may have a thickness of, for example, 100 μm, 120 μm, 130 μm, 140 μm, 150 μm, 160 μm, 170 μm, 180 μm, 190 μm or 200 μm.

In an embodiment of the present disclosure, the ceramic layer is selected from the group consisting of zirconia, yttria, yttria-stabilized zirconia and a combination thereof. As a preferred embodiment, the ceramic layer is a yttria-stabilized zirconia layer with a hollow structure.

Figure 2:
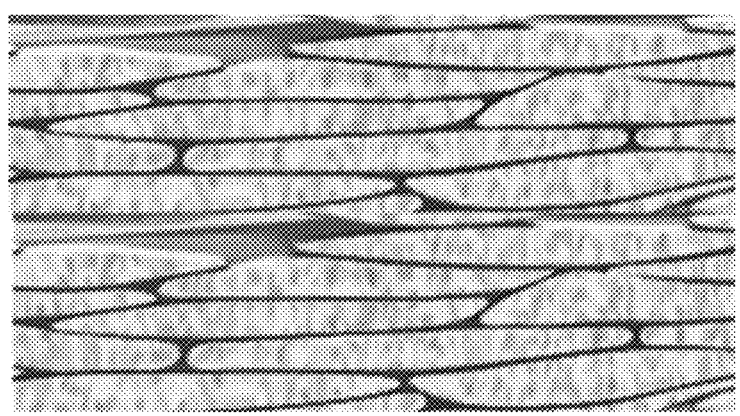
FIG. 2 is a schematic diagram of a wave-like superposition structure of an embodiment.

FIG. 1 is an electronic microscopic image of a ceramic layer of an embodiment of the present disclosure. Zirconia, yttria or yttria-stabilized zirconia, especially yttria-stabilized zirconia with a hollow structure, can form a wave-like superposition structure (as shown in FIG. 1), thereby improving the toughness of the ceramic layer. FIG. 2 is a schematic diagram of a wave-like superposition structure of an embodiment. As shown in FIG. 2, the wave-like superposition structure in the embodiment of the present disclosure may be understood that the formed ceramic particles are arranged in a curved and staggered manner, rather than in a linear or non-interference arrangement.

The formation of a wave-like superimposed structure can improve the porosity of the ceramic layer while prevent the high-temperature gas in the engine from penetrating into the transition layer and the metal bonding layer. In addition, this structure can also make the heat insulation performance of the piston with the composite coating variation along with the temperature of the combustion chamber, for example, when the temperature of the engine combustion chamber is high, the heat insulation performance of the piston may be increased, and when the temperature of the engine combustion chamber is low, the heat insulation performance of the piston may be reduced. The heat insulation performance may be understood in that: if the temperature of the combustion chamber is T1 and the temperature of the piston body is T2, the heat insulation performance is represented by the difference between T1 and T2. The heat insulation performance of the piston various with the temperature of the combustion chamber, which can improve the combustion efficiency of the engine, reduce heat loss, and facilitate of combustion.

In a preferred embodiment of the present disclosure, the yttria-stabilized zirconia layer is yttria-stabilized zirconia with a hollow structure.

In a preferred embodiment of the present application, the ceramic layer may have a thickness of 400-500 μm. The ceramic layer may have a thickness of, for example, 400 μm, 420 μm, 430 μm, 440 μm, 450 μm, 460 μm, 470 μm, 480 μm, 490 μm or 500 μm.

In an embodiment of the present application, the sealing layer is formed by a sealant selected from the group consisting of polysilazane, water glass, polysiloxane and a combination thereof.

The composite coating in an embodiment of the present disclosure may have an overall thickness of 600-800 μm, which can greatly improve the bonding strength between the composite coating and the steel piston basic body, effectively improve the oxidation resistance of the top of the piston, reduce high-temperature corrosion, prolong the service life of the piston, significantly reduce the absorption amount of carbon deposition on the top of the piston, and effectively alleviate the problem of coking of cooling oil. Compared with the uncoated piston, the heat insulation performance of the top of the piston coated with heat-insulation, anti-carbon deposition and anti-oxidation composite coating may be increased by 30~50° C.

In an embodiment of the present disclosure, a composite coating may be coated on the surface of a piston basic body by an atmospheric plasma spraying method or a high-velocity flame spraying method. In particular, exemplarily, during the preparation of a composite coating, a metal bonding layer can be formed on the ablation surface of a piston basic body, then a transition layer is formed on the surface of the metal bonding layer, a ceramic layer is deposited on the surface of the transition layer, and then a temperature-resistant sealing layer is prepared on the surface of the ceramic layer by cold spraying+high-temperature curing, so as to overcome the technical defects such as high brittleness, easy crack or peeling off of traditional ceramic coating on the top of the piston, serious carbon deposition on the top of the piston, and short service life of the piston.

In an embodiment of the present disclosure, a process of preparing a composite coating on the ablation surface of a piston basic body comprises the following steps:

step S11, plasma-spraying a metal bonding layer on the top surface, i.e., the ablation surface, of the piston basic body, where the metal bonding layer has a thickness of 100±50 μm;

step S12, plasma-spraying a rare earth metal modified zirconia layer as a transition layer on the surface of the metal bonding layer, where the rare earth metal modified zirconia layer has a thickness of 150±50 μm;

step S13, plasma-spraying yttria-stabilized zirconia with a hollow structure on the surface of the transition layer to form a ceramic layer, where the ceramic layer has a thickness of 450±50 μm;

step S14, performing sealing treatment on the surface of the ceramic layer to form a sealing layer, wherein a sealant material may be selected from the group consisting of polysilazane, water glass, polysiloxane and a combination thereof.

In an embodiment of the present disclosure, the preparation method further comprises a step of pretreating the piston basic body before spraying the metal bonding layer on the ablation surface of the piston basic body.

The pretreatment is as follows: sandblasting and roughening the top surface of the steel piston basic body. In particular, during the sandblasting and roughening treatment, the piston basic body is sandblasted and roughened using corundum powder or quartz sand. The roughness of the surface of the roughened piston basic body is required to be Ra 2.5~4.5, to increase the bonding strength between the metal bonding layer and the piston basic body.

In an embodiment of the present disclosure, in step S11, a plasma spraying method may be used to form the metal bonding layer.

In an embodiment of the present disclosure, in step S12, during the preparation of the transition layer, a rare earth metal-modified zirconia layer is sprayed on the surface of the metal bonding layer using a plasma spraying equipment. In particular, $ZrO_2$ is used as a raw material to prepare rare earth metal modified zirconia powders for spraying with a particle size between 10 and 100 μm by centrifugal spray granulation and plasma arc spheroidization. By using the plasma spraying method, the melted and accelerated powder is deposited onto the surface of the piston basic body coated with a metal bonding layer. The modified zirconia layer may have a thickness of 100-200 μm.

In an embodiment of the present disclosure, in step S13, a ceramic layer is sprayed on the surface of the transition layer using a plasma spraying equipment. In particular, yttria-stabilized $ZrO_2$ with a hollow structure is used as a raw material with a particle size of 10-100 μm. By using the plasma spraying method, the melted and accelerated powder is deposited onto the surface of the modified zirconia layer. The coating may have a thickness of 400~500 μm.

In an embodiment of the present disclosure, in step S14, the surface of the yttria-stabilized zirconia layer is subjected to sealing process by smearing, spraying or painting, wherein a sealant may be selected from the group consisting of polysilazane, water glass, polysiloxane or a combination thereof; the sealing layer has a thickness of preferably 2-20 μm. The sealed piston is subjected to a curing process at 300~400° C.

The piston provided by the above embodiments of the present disclosure has abilities of heat insulation, anti-carbon deposition and oxidation resistance, and reduces the chemical erosion of high-temperature and high-pressure gas.

With the same technical idea, the present disclosure further provides a piston, comprising a piston basic body and the composite coating described in the above embodiments of the present disclosure, wherein the composite coating is configured on the ablation surface of the piston basic body.

The piston basic body can be, for example, a metal piston basic body. The surface of the piston basic body facing the engine combustion chamber is the ablation surface thereof, which may be a plane or a grooved surface. The composite coating can be provided on the ablation surface. The metal bonding layer of the composite coating is in contact with the piston basic body, and is bonded and fixed on the surface of the piston basic body.

The piston of the present disclosure has the characteristics of good heat insulation performance and long service life.

Comparative Example 1: the surface of the piston of this comparative example is not coated with any coating.

Comparative Example 2: the ablation surface of the piston of this comparative example is only sequentially coated with a metal bonding layer and a ceramic layer. The metal bonding layer is bonded to the piston basic body, and the metal bonding layer does not contain rare earth metals.

Figure 3:
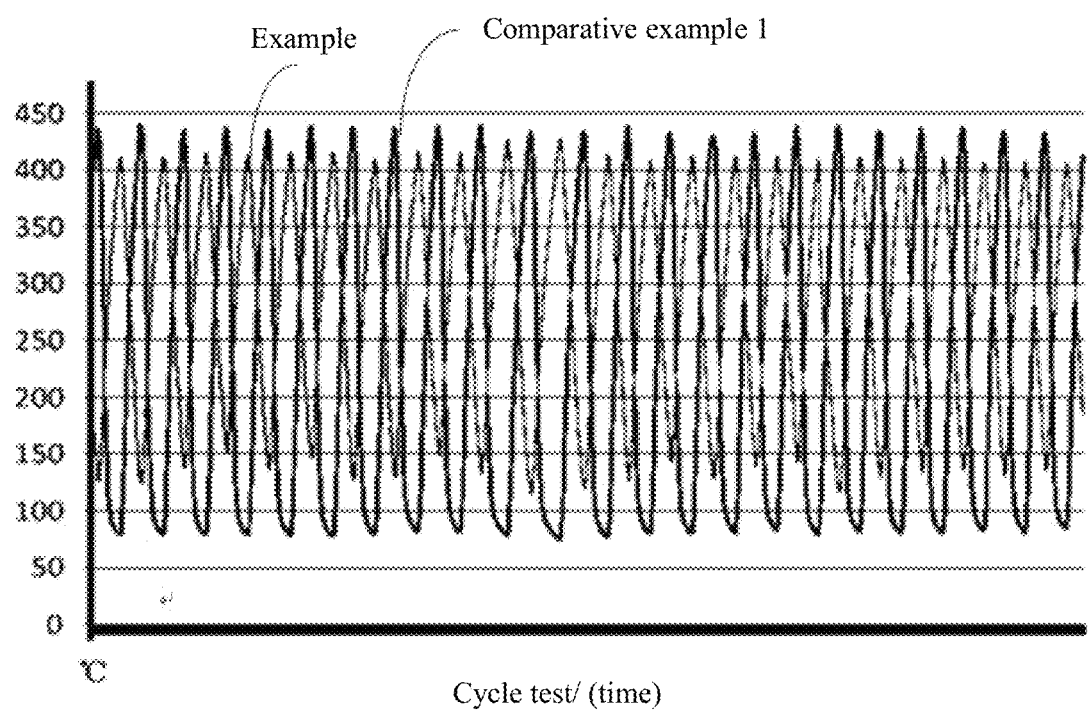
FIG. 3 shows the heat insulation effect test of pistons of an embodiment and a comparative example of the present application.

FIG. 3 shows the heat insulation effect test of pistons of an example of the present disclosure and Comparative Example 1, wherein Comparative Example 1 is a piston without any coating configured on the surface. The test process is as follows: the piston of the example and the piston of Comparative Example 1 are placed at the same temperature, and the temperature of the piston body of the piston of the example and the piston of Comparative Example 1 is tested. It can be seen from the test results shown in FIG. 3 that the piston coated with the composite coating of the example of the present disclosure has good heat insulation performance and can reduce the temperature of the top surface of the piston body by 30-50° C.

In addition, in the present disclosure, the comparison between the heat insulation performances of the piston of the example of the present disclosure and the piston of Comparative Example 2 is further made. The heat insulation performance of the piston of the embodiment of the present disclosure is better than that of Comparative Example 2, where the temperature difference between the heat insulation capabilities of the two pistons is 10-15° C.

Figure 4:
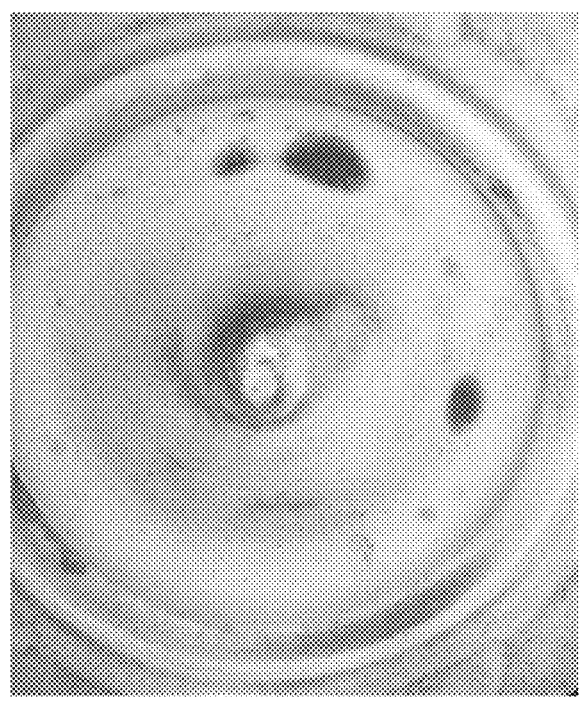
FIG. 4 is a surface view of a piston of an embodiment of the present application subjected to thermal shock test 3000 times.

FIG. 4 is a surface view of a piston of an example of the present disclosure subjected to a thermal shock test of 3000 times. As shown in FIG. 4, the piston of the example of the present disclosure exhibits no cracks or peeling off on the surface after being subjected to thermal shock test of 3000 times, indicating that the piston of the example of the present disclosure has good thermal fatigue resistance.

The piston of Comparative Example 2 exhibits cracks on the coating on the surface after being subjected to thermal shock test of 3000 times.

Apparently, those skilled in the art can make various changes and modifications to the embodiments of the present application without departing from the spirit and scope of the present application. In this way, if these modifications and variations of the present application fall within the scope of the claims of the present application and the equivalent technologies thereof, the present application is also intended to include these modifications and variations.

The invention claimed is:

1. A composite coating for piston, wherein the composite coating comprises a metal bonding layer, a transition layer, a ceramic layer and a sealing layer which are sequentially laminated; wherein the metal bonding layer is configured to be bonded with a piston basic body, the metal bonding layer is a rare earth metal modified bonding layer, and the transition layer is a rare earth metal modified zirconia layer,
   wherein the ceramic layer is selected from the group consisting of zirconia, yttria, yttria-stabilized zirconia and a combination thereof,
   wherein the ceramic layer is configured to form a wave-like superposition structure in which ceramic particles are arranged in a curved and staggered manner rather than in a linear or non-interference arrangement.

2. The composite coating according to claim 1, wherein the metal bonding layer is selected from the group consisting of a rare earth metal modified NiCoCrAlY layer, a rare earth metal modified NiCrAlY layer, a rare earth metal modified NiAlY layer and a combination thereof;
   wherein, the rare earth metal is selected from the group consisting of Ce, Y, Re, Nd, La, Sm and a combination thereof.

3. The composite coating according to claim 2, wherein, in the metal bonding layer, the addition amount of rare earth metal is 0.5%-1% by mass percentage.

4. The composite coating according to claim 3, wherein, in the transition layer, the rare earth metal is selected from the group consisting of Ce, Y, Re, Nd, La, Sm and a combination thereof.

5. The composite coating according to claim 3, wherein the ceramic layer is selected from the group consisting of zirconia, yttria, yttria-stabilized zirconia and a combination thereof.

6. The composite coating according to claim 2, wherein the metal bonding layer has a thickness of 50-150 μm.

7. The composite coating according to claim 6, wherein, in the transition layer, the rare earth metal is selected from the group consisting of Ce, Y, Re, Nd, La, Sm and a combination thereof.

8. The composite coating according to claim 6, wherein the ceramic layer is selected from the group consisting of zirconia, yttria, yttria-stabilized zirconia and a combination thereof.

9. The composite coating according to claim 2, wherein, in the transition layer, the rare earth metal is selected from the group consisting of Ce, Y, Re, Nd, La, Sm and a combination thereof.

10. The composite coating according to claim 2, wherein the ceramic layer is selected from the group consisting of zirconia, yttria, yttria-stabilized zirconia and a combination thereof.

11. The composite coating according to claim 1, wherein, in the transition layer, the rare earth metal is selected from the group consisting of Ce, Y, Re, Nd, La, Sm and a combination thereof.

12. The composite coating according to claim 11, wherein, in the transition layer, the addition amount of rare earth metal is 0.5%-1% by mass percentage.

13. The composite coating according to claim 11, wherein, the transition layer is formed by a raw material with a powder particle size of 10-100 μm.

14. The composite coating according to claim 11, wherein the transition layer has a thickness of 100-200 μm.

15. The composite coating according to claim 1, wherein the ceramic layer is an yttria-stabilized zirconia layer with a hollow structure.

16. The composite coating according to claim 1, wherein, the ceramic layer has a thickness of 400-500 μm.

17. A piston, comprising a piston basic body and the composite coating according to claim 1, wherein the composite coating is provided on an ablation surface of the piston basic body.

18. An engine comprising the piston according to claim 17.

19. A vehicle, comprising the engine according to claim 18.

* * * * *